No. 629,635. Patented July 25, 1899.
C. WESTALL.
BICYCLE DRIVING GEAR.
(Application filed June 4, 1898.)
(No Model.)
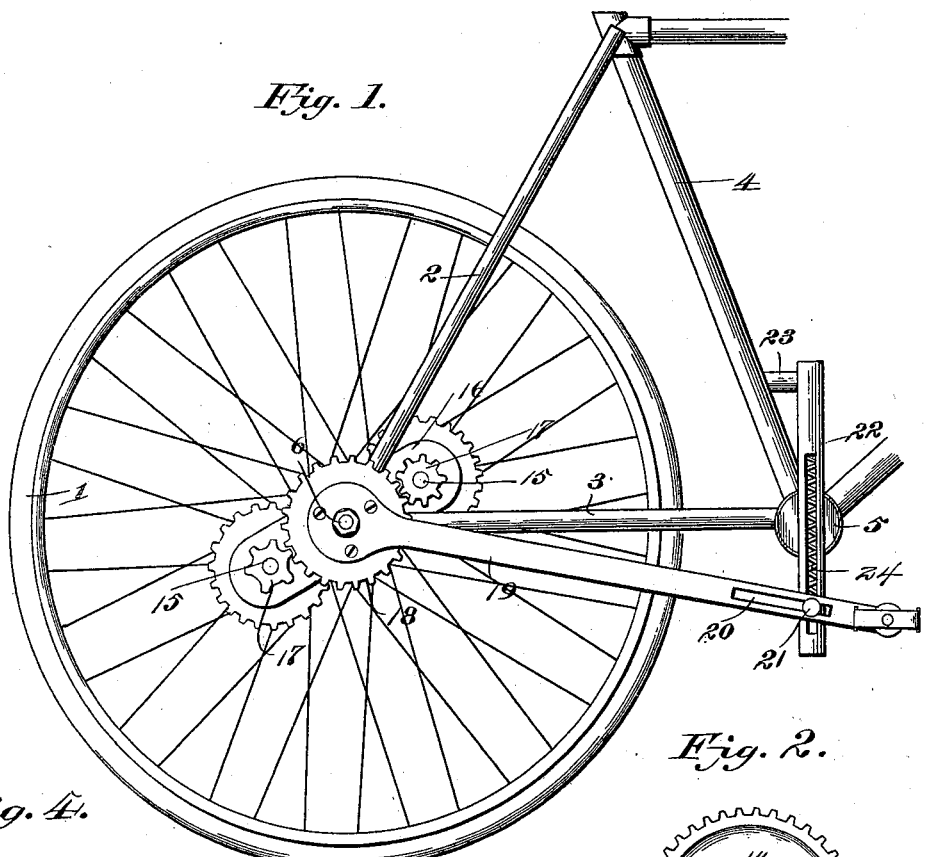
Fig. 1.
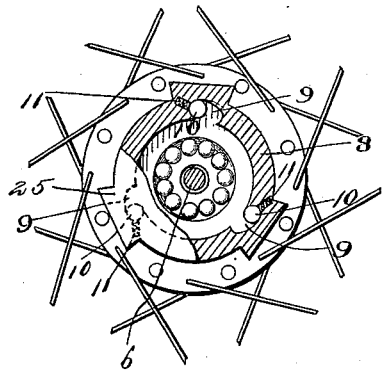
Fig. 4.
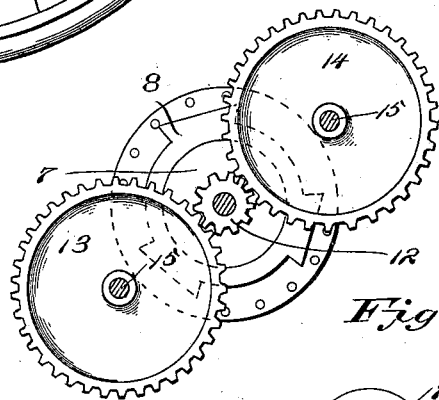
Fig. 2.
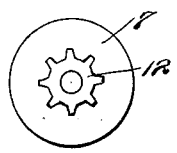
Fig. 3.
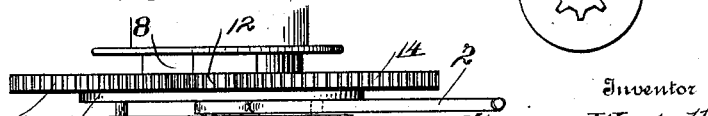
Witnesses
C. U. Walker.
H. L. Amer.
Inventor
Charles Westall.
by V. D. Stockbridge.
his Attorney.
THE NORRIS PETERS CO., PHOTO-LITHO., WASHINGTON, D. C.

UNITED STATES PATENT OFFICE.

CHARLES WESTALL, OF MIDDLEBURY, VERMONT, ASSIGNOR OF ONE-HALF TO THEODORE HENCKELS, OF SAME PLACE.

BICYCLE DRIVING-GEAR.

SPECIFICATION forming part of Letters Patent No. 629,635, dated July 25, 1899.

Application filed June 4, 1898. Serial No. 682,604. (No model.)

*To all whom it may concern:*

Be it known that I, CHARLES WESTALL, a citizen of the United States, residing at Middlebury, in the county of Addison and State of Vermont, have invented certain new and useful Improvements in Bicycle Driving-Gears; and I do hereby declare the following to be a full, clear, and exact description of the invention, such as will enable others skilled in the art to which it appertains to make and use the same.

This invention relates to driving-gear for bicycles and other chain-propelled vehicles, and has for its primary and main object to dispense with the usual driving-chain and friction incident to the use thereof and to substitute therefor a simple construction of driving-gear which is applicable to any ordinary form of safety-bicycle, thus adapting the ordinary driving-chain and sprockets to be removed from the machine and to be replaced by the improved mechanism hereinafter described.

The detailed objects and advantages of the invention will be fully pointed out in the course of the subjoined description.

The invention consists in driving-gear for bicycles embodying certain novel features and details of construction and relative disposition of parts, as hereinafter fully described, illustrated in the drawings, and incorporated in the claim hereto appended.

In the accompanying drawings, Figure 1 is a side elevation of a sufficient portion of a bicycle to illustrate the application of the improved driving-gear thereto. Fig. 2 is an enlarged vertical longitudinal section taken between the bearing plate or bracket and the clutch on the hub of the axle, showing the clutch and the gears. Fig. 3 is a detail horizontal section showing the manner in which the several gears intermesh. Fig. 4 is an enlarged detail section through the clutch on the hub of the rear wheel, showing the friction devices and their actuating means. Fig. 5 is a detail view showing the inner disk or collar with its pinion.

Similar numerals of reference designate corresponding parts in all the figures of the drawings.

In the drawings I have shown the improved driving-gear as applied to an ordinary safety-bicycle, in which 1 designates the rear or driving wheel; 2, the rear braces; 3, the bottom runs; 4, the seat-post tube, and 5 the crank-hanger. The axle 6 of the driving-wheel is stationary, as usual, and mounted to turn loosely upon said axle between the fork and wheel is a friction collar or disk 7, which fits snugly within a surrounding band or collar 8, bolted or otherwise secured fixedly to the hub of the rear wheel and containing a plurality of sockets or recesses 9, the outer walls of which converge toward the outer edge of the collar 7. Three of such sockets or recesses 9 are shown; but more or less may be employed, as deemed most expedient. Within each socket is mounted a clutch in the form of a roller 10, which is actuated toward the narrow end of the socket by means of a spiral spring 11 exerting a constant pressure against the same, so as to take up any lost motion and cause the clutch as a whole to act in a quick and reliable manner. Thus when rotary motion is imparted to the collar 7 it will, through the agency and coöperation of the rollers 10, take up and actuate the surrounding collar 8, which being secured fixedly to the driving-wheel imparts rotary motion thereto for propelling the machine ahead.

The collar or disk 7 is provided on its outer side with a spur-pinion 12, which meshes with and is actuated by a pair of spur-gears 13 and 14, mounted one in rear and the other in advance of the axle of the driving-wheel, each fast upon a short transverse axle 15, journaled in an obliquely extending or inclined bearing plate or bracket 16, mounted fast with relation to the machine-frame between the rear fork and the adjacent side of the driving-wheel. On the outer end of each shaft 15 is a spur-pinion 17, and these two spur-pinions mesh with and are actuated by a large spur gear-wheel 18, fixedly connected to the rear end of a pedal-lever 19 and journaled on the rear axle 6 outside of the machine-frame, as clearly shown in Fig. 1.

The forward end of the pedal-lever is provided with a longitudinal slot 20, in which works a headed pin 21, the said pin also working up and down in a substantially vertical housing or bar 22, slotted throughout nearly its entire length and supported at its upper end by means of a bracket 23, connected to the seat-post tube 4 and also connected, if desired, to the crank-hanger 5 in any convenient manner. Extending longitudinally within the slot of the bar or housing 22 is a spring 24, preferably of spiral form, which serves to lift the pin 21, and thereby elevate the pedal-lever after it has been depressed by the foot of the rider.

It will be apparent that the mechanism hereinabove described is duplicated upon each side of the machine, and the action of the pedal-levers is therefore independent and it is possible for the machine to be driven by one foot alone or by both feet at the same time or alternately. When the pedal-levers are at the upper limit of their stroke, the driving-wheel of the machine is left free to continue its forward rotation and there is no friction between the parts of the driving mechanism. The friction-rollers 10, together with their springs 11, may be rendered dust-proof by placing annular dust caps or plates 25 upon the inner and outer sides of the collars 7 and 8 where they meet, the said dust-caps being sufficiently wide to cover the sockets 9. It is also within the scope of this invention to cover in the entire gearing by means of a suitable gear-case. These and other changes in the form, proportion, and minor details of construction may be resorted to without departing from the principle or sacrificing any of the advantages of the invention.

While the driving-gear has been described in connection with a bicycle, it is obvious that it may be employed on any kind of foot-propelled vehicle. Ball-bearings may be employed in connection with the rear axle, as shown in Fig. 4, and also in connection with the other gear-wheels and pedal-levers wherever it may be deemed expedient.

Having thus described the invention, what is claimed as new, and desired to be secured by Letters Patent, is—

The combination with the driving-wheel of a bicycle, of a collar fast on the hub of the driving-wheel, a friction-collar mounted within the same and designed to be thrown into clutched engagement with the collar on the driving-wheel, a concentric pinion fast on said inner collar, a stationary bearing-plate interposed between the frame and one side of the driving-wheel, gears journaled on said plate, a pedal-lever journaled on the axle outside of the frame, a gear-wheel fast to said lever and meshing with the aforesaid gears, and means for elevating the free end of said lever independently of the lever on the other side of the machine.

In testimony whereof I affix my signature in presence of two witnesses.

CHARLES WESTALL.

Witnesses:
H. L. SHELDON,
OTTO P. MOORE.